United States Patent
Christie et al.

(10) Patent No.: US 10,511,871 B2
(45) Date of Patent: Dec. 17, 2019

(54) DECISION LOGIC

(71) Applicant: PIKSEL, INC., Wilmington, DE (US)

(72) Inventors: Mark Christie, London (GB); Kris Brown, Retford (GB); Paul Mardling, London (GB); Ralf Tillmann, Mannheim (DE)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/510,975

(22) PCT Filed: Sep. 11, 2015

(86) PCT No.: PCT/EP2015/070859
§ 371 (c)(1),
(2) Date: Mar. 13, 2017

(87) PCT Pub. No.: WO2016/038199
PCT Pub. Date: Mar. 17, 2016

(65) Prior Publication Data
US 2017/0244987 A1    Aug. 24, 2017

(30) Foreign Application Priority Data

Sep. 11, 2014   (GB) .................................. 1416070.9

(51) Int. Cl.
*H04N 21/239* (2011.01)
*H04N 21/2662* (2011.01)
(Continued)

(52) U.S. Cl.
CPC ..... *H04N 21/2393* (2013.01); *H04N 21/2405* (2013.01); *H04N 21/258* (2013.01); *H04N 21/2662* (2013.01); *H04L 41/5009* (2013.01)

(58) Field of Classification Search
CPC .............. H04N 21/2393; H04N 21/24; H04N 21/2404; H04N 21/2405; H04N 21/266;
(Continued)

(56) References Cited

U.S. PATENT DOCUMENTS 6,407,680 B1 * 6/2002 Lai ..................... H04N 7/17318
                                                    341/50
6,480,861 B1 * 11/2002 Kanevsky ................ G06F 9/50
(Continued)

FOREIGN PATENT DOCUMENTS

| WO | 2001/22688 A1 | 3/2001 |
| WO | 2011/128846 A3 | 1/2012 |

OTHER PUBLICATIONS

International Search Report and Written Opinion, dated Nov. 13, 2015, EPO.
UK Search Report, dated Feb. 12, 2016, UK IPO.

*Primary Examiner* — James R Sheleheda
(74) *Attorney, Agent, or Firm* — Holzer Patel Drennan (57) ABSTRACT

A network entity for delivering video to a front end in accordance with service level information defining at least one service level requirement for providing a service used in delivering the video, the network entity comprising: an input for receiving a request comprising task information identifying a task to be performed requiring the service for delivery of the video; an interface for communication with processing nodes each configured to provide the service for use in delivering the video; and decision logic coupled to the interface and configured to: receive (i) the request transmitted by the video content provider, (ii) characteristics of the processing nodes, and (iii) the at least one service level requirement for providing the service; select processing node(s) based on the received characteristics and the at least one service level requirement, and communicate via the
(Continued)

interface with the processing node(s) selected to perform the task.

19 Claims, 5 Drawing Sheets

(51) Int. Cl.
*H04N 21/24* (2011.01)
*H04N 21/258* (2011.01)
*H04L 12/24* (2006.01)

(58) Field of Classification Search
CPC .............. H04N 21/2662; H04N 21/258; H04L 41/5009
See application file for complete search history.

(56) References Cited

U.S. PATENT DOCUMENTS

| | | | | |
|---|---|---|---|---|
| 6,980,964 | B1 * | 12/2005 | Cocotis | G06Q 10/06315 705/7.25 |
| 7,289,489 | B1 * | 10/2007 | Kung | H04L 12/14 370/352 |
| 7,464,163 | B1 * | 12/2008 | Bantz | G06Q 10/10 709/226 |
| 8,019,683 | B1 * | 9/2011 | Swanburg | G06Q 20/102 370/259 |
| 8,214,533 | B2 | 7/2012 | Nishi | H04L 12/46 709/223 |
| 8,798,246 | B1 * | 8/2014 | Viswanathan | G06Q 30/0241 379/114.02 |
| 8,965,957 | B2 * | 2/2015 | Barros | G06F 16/254 709/203 |
| 9,367,379 | B1 * | 6/2016 | Burke | G06F 11/0706 |
| 9,740,435 | B2 * | 8/2017 | Dolce | G06F 3/0605 |
| 9,923,798 | B1 * | 3/2018 | Bahadur | H04L 45/00 |
| 9,953,327 | B2 * | 4/2018 | Morrow | G06Q 30/00 |
| 10,230,658 | B2 * | 3/2019 | Tischer | H04L 41/5003 |
| 10,346,775 | B1 * | 7/2019 | Xu | G06Q 10/06315 |
| 2002/0087674 | A1 * | 7/2002 | Guilford | H04W 48/18 709/223 |
| 2002/0146102 | A1 * | 10/2002 | Lang | H04M 15/00 379/114.02 |
| 2003/0097443 | A1 * | 5/2003 | Gillett | H04L 29/06 709/225 |
| 2005/0114439 | A1 * | 5/2005 | Hodges | H04L 41/5003 709/203 |
| 2005/0209804 | A1 * | 9/2005 | Basso | H04L 69/28 702/79 |
| 2006/0111079 | A1 * | 5/2006 | Tischer | H04M 15/56 455/406 |
| 2007/0271276 | A1 * | 11/2007 | Allen | G06Q 10/06 |
| 2008/0209067 | A1 * | 8/2008 | John | G06F 16/40 709/231 |
| 2010/0017516 | A1 | 1/2010 | Sparrell et al. | |
| 2011/0255555 | A1 * | 10/2011 | Alexander | H04N 21/23805 370/468 |
| 2012/0054812 | A1 | 3/2012 | Lee | |
| 2013/0041728 | A1 * | 2/2013 | Morrow | G06Q 30/00 705/14.4 |
| 2016/0255378 | A1 * | 9/2016 | Brooks | H04N 7/17318 725/96 |
| 2017/0324782 | A1 * | 11/2017 | Roth | H04L 63/205 |
| 2018/0302299 | A1 * | 10/2018 | Sun | H04L 41/5019 |

* cited by examiner

DECISION LOGIC

BACKGROUND

An ever-increasing quantity of media content is being produced that can be viewed by a content consuming user (content consumer) on a viewing device, such as a television ("TV") or similar.

Cloud computing based Over-the-top (OTT) delivery of content has become a popular service. "OTT delivery" refers to the online delivery of video and audio over a data network such as the Internet without an Internet service provider (ISP) involved in the control or distribution of the content. The term "cloud computing" refers to all of the technologies that can be used to provide computation, software, data access, and storage services that do not require end-user knowledge of the physical location and configuration of the system that delivers the services of an OTT video solution. The required software and data providing the cloud computing based OTT video solution can be stored on server(s) at remote location(s) rather than being stored on the server (s) of a customer of the OTT video solution. The cloud can comprise interconnected nodes such as various servers, databases, gateways and so on. A cloud computing based OTT video solution can thus be seen as a concept where the computing of a video solution is delivered as a service rather than a product and where resources and services may be shared and exist in a "cloud".

SUMMARY

According to one aspect of the present disclosure there is provided a network entity for delivering video content that is provided by a video content provider to a front end in accordance with service level information which defines at least one service level requirement for providing a service used in delivering the video content to the front end, the network entity comprising: an input for receiving a request comprising task information identifying a task to be performed requiring said service for delivery of the video content to the front end; an interface for communication with processing nodes each configured to provide the service for use in delivering the video content to the front end; and decision logic coupled to the interface and configured to: receive (i) the request transmitted by said video content provider, (ii) characteristics of the processing nodes, and (iii) the at least one service level requirement for providing the service; select one or more of the processing nodes based on the received characteristics and the at least one service level requirement; and communicate via said interface with the one or more processing node selected to perform said task.

The decision logic may be further configured to determine if the service request comprises an indicator indicating that the task is to be performed in accordance with requested service level information; wherein the at least one service level requirement corresponds to default service level information if the service request does not comprise said indicator; and the at least one service level requirement corresponds to requested service level information overriding the default service level information if the service request comprises said indicator.

The decision logic may be configured to determine that only a single processing node of said processing nodes is able to perform said task in accordance with the at least one service level requirement, and in response to said determination select said single processing node and communicate via said interface with the selected single processing node to perform said task.

The decision logic may be configured to determine that a plurality of said processing nodes are able to perform said task in accordance with the at least one service level requirement, and in response to said determination select one or more of the plurality of processing nodes in accordance with predetermined rules.

The predetermined rules may specify that only one of the plurality of said processing nodes able to perform said task should be selected. Alternatively, the predetermined rules may specify that a combination of a predetermined number of the plurality of said processing nodes able to perform said task should be selected.

The decision logic may be configured to determine that no single processing node of said processing nodes is able to perform said task in accordance with the at least one service level requirement, and in response to said determination the decision logic is configured to determine if one or more combination of said processing nodes is able to perform said task in accordance with the at least one service level requirement.

In response to determining that a single combination of said processing nodes is able to perform said task in accordance with the at least one service level requirement, the decision logic may be configured to select said single combination of said processing nodes and communicate via said interface with the selected single combination of processing nodes to perform said task.

In response to determining that a plurality of combinations of said processing nodes are able to perform said task in accordance with the at least one service level requirement, the decision logic may be configured to select one of said plurality of combinations of said processing nodes in accordance with predetermined rules, and communicate via said interface with the selected combination of processing nodes to perform said task.

In response to determining no combination of said processing nodes is able to perform said task in accordance with the at least one service level requirement, the decision logic may be configured to determine if the service level information comprises an indicator indicating that it is acceptable for the task to be performed without complying with the at least one service level requirement.

In response to determining the service level information comprises an indicator indicating that it is acceptable for the task to be performed without complying with the at least one service level requirement, the decision logic may be configured to: select a processing node or combination of said processing nodes to perform said task; communicate via said interface with the selected processing node or combination of said processing nodes to perform said task; and transmit a message to the video content provider indicating that the task was performed without complying with the at least one service level requirement.

In response to determining the service level information does not comprise an indicator indicating that it is acceptable for the task to be performed without complying with the at least one service level requirement, the decision logic may be configured to transmit a message to the video content provider indicating that the task was not performed.

The decision logic may be configured to determine that a predetermined period of time has elapsed since characteristics of a processing node of said processing nodes have been received, and in response to said determination the decision logic may be configured to consider said processing node for selection to perform said task using service level information that has been agreed with a service provider associated with the processing node for providing said service, instead of characteristics of said processing node, The decision logic may be configured to determine that a predetermined period of time has elapsed since characteristics of a processing node of said processing nodes have been received, and in response to said determination the decision logic may be configured to supply a test task to said processing node that is to be performed by said processing node.

The decision logic may be configured to determine based on received characteristics of a processing node that the processing node is not complying with service level information that has been agreed with a service provider associated with the processing node for providing said service, and in response to said determination the decision logic may be configured to remove said processing node from consideration for selection to perform said task for a predetermined period of time.

The characteristics may include one or any combination of: the geographical positions of the processing nodes; the availability of the processing nodes; the financial cost of using the processing nodes; the quality of the output provided by the processing node; the capacity of the processing nodes; the throughput of the processing nodes and the utilization of the processing nodes The service may be one of: a content recommendation service, a content quality verification service, a content storage service, an electronic programming guide service, a concurrency service, a content consumer entitlement verification service, a content metadata management service, an encoding service, a geographical awareness of content consuming devices service, a device verification service, a transcoding service, a digital rights management service, a content encryption service, an analytics service, a content consumer subscriptions service, a content delivery network service, a content ingestion service, a user profile management service, a content security service, provision of a content player, a payment service, and a billing service.

The decision logic may be configured to communicate via said interface with the selected one or more processing node using an application programming interface.

According to another aspect of the present disclosure there is provided a method for delivering video content that is provided by a video content provider to a front end in accordance with service level information which defines at least one service level requirement for providing a service used in delivering the video content to the front end, the method comprising: receiving characteristics of processing nodes each configured to provide the service for use in delivering the video content to the front end, receiving a request comprising task information identifying a task to be performed requiring said service for delivery of the video content to the front end; receiving the at least one service level requirement for providing the service; selecting one or more of the processing nodes based on the received characteristics and the at least one service level requirement, and communicating with the one or more processing node selected to perform said task.

According to another aspect of the present disclosure there is provided a computer program product for delivering video content that is provided by a video content provider to a front end in accordance with service level information which defines at least one service level requirement for providing a service used in delivering the video content to the front end, the computer program product being embodied on a non-transient computer-readable medium and configured so as when executed on one or more processors to: receive characteristics of processing nodes each configured to provide the service for use in delivering the video content to the front end; receive a request comprising task information identifying a task to be performed requiring said service for delivery of the video content to the front end; receive the at least one service level requirement for providing the service; select one or more of the processing nodes based on the received characteristics and the at least one service level requirement; and communicate with the one or more processing node selected to perform said task.

According to another aspect of the present disclosure there is provided a network entity for delivering a video solution comprising a plurality of services that are used in combination for delivery of video content that is provided by a video content provider to a front end, wherein the plurality of services comprise at least a storage service, an encoding service and a content player service, and the video content is delivered in accordance with service level information which defines at least one service level requirement for providing a service of said plurality of services, the network entity comprising: an input for receiving a request comprising task information identifying a task to be performed requiring said service for delivery of the video content to the front end; an interface for communication with processing nodes each configured to provide the service for use in delivering the video content to the front end; and decision logic coupled to the interface and configured to: receive (i) the request transmitted by said video content provider, (ii) characteristics of the processing nodes, and (iii) the at least one service level requirement for providing the service; select one or more of the processing nodes based on the received characteristics and the at least one service level requirement, and communicate via said interface with the one or more processing node selected to perform said task.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Figure 1:
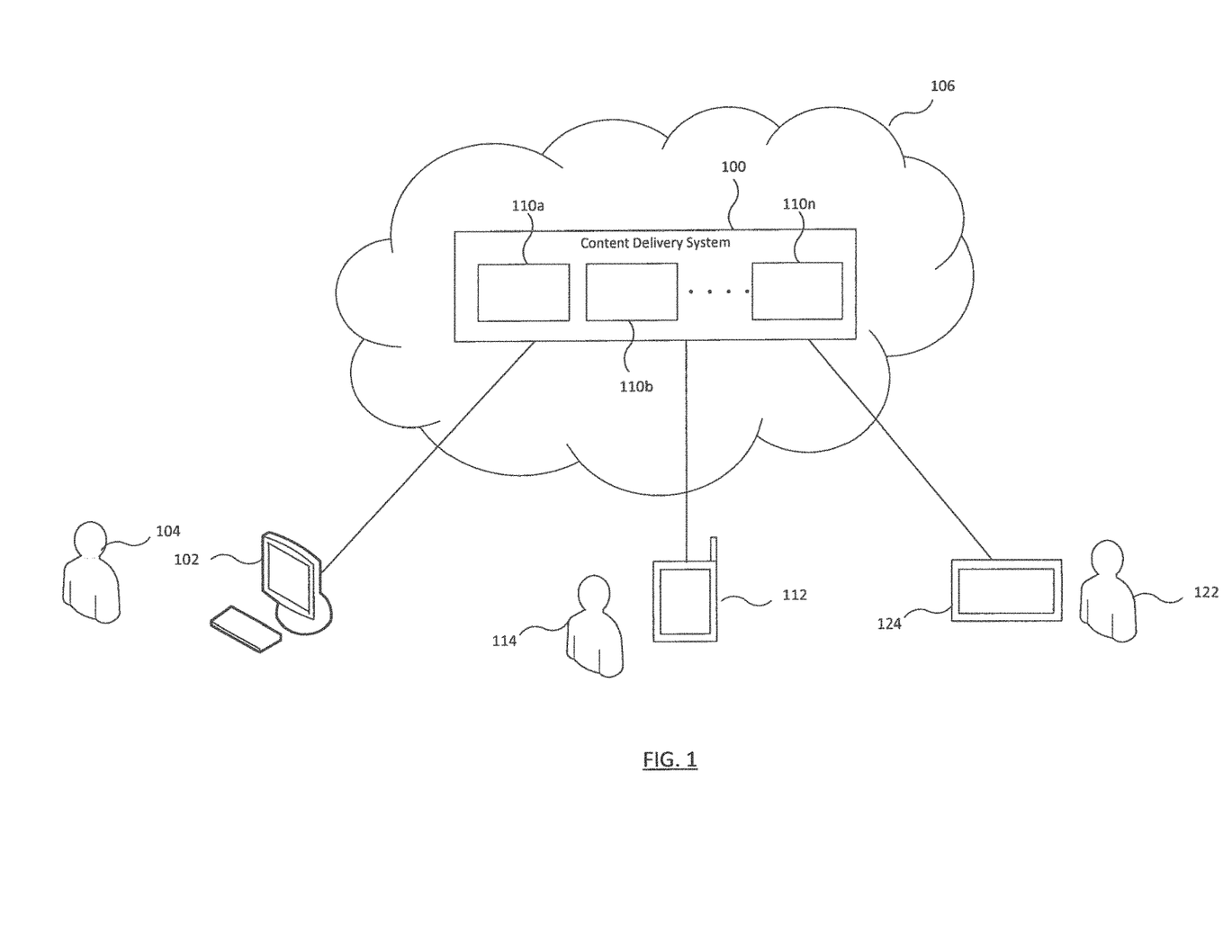
FIG. 1 illustrates a schematic view of a content delivery system coupled to content consuming devices.

FIG. 1 illustrates a content delivery system 100 implemented using a plurality of network devices in a packet based network 106.

The content delivery system 100 comprises a plurality of processing nodes 110 that are used in combination to deliver video content to a front end. That is, a plurality of media consuming devices are shown in FIG. 1 as being coupled to the packet based network 106 to receive content delivered by the content delivery system 100.

FIG. 1 shows a first content consumer 104 (content consumer A) associated with a first content consuming device 102, a second content consumer 114 (content consumer B) associated with a second content consuming device 112, and a third consumer 124 (content consumer C) associated with a third content consuming device 122. Whilst only three content consumers are shown as being present for simplicity, this number of content consumers is merely an example and will typically be much higher.

A content consuming device may be, for example, an Internet enabled TV, mobile phone, a personal digital assistant ("PDA"), a personal computer ("PC") (including, for example, Windows™, Mac OS™ and Linux™ PCs), a tablet computer, a gaming device or other embedded device able to connect to the packet-based network 106. A content consuming device is arranged to receive information from and output information to the content consumer associated with the content consuming device. A content consuming device may connect to the packet-based network 106 via an additional intermediate network not shown in FIG. 1. For example, if the content consuming device is a mobile device, then it can connect to the packet-based network 106 via a cellular mobile network (not shown in FIG. 1), for example a GSM or UMTS network.

Figure 2:
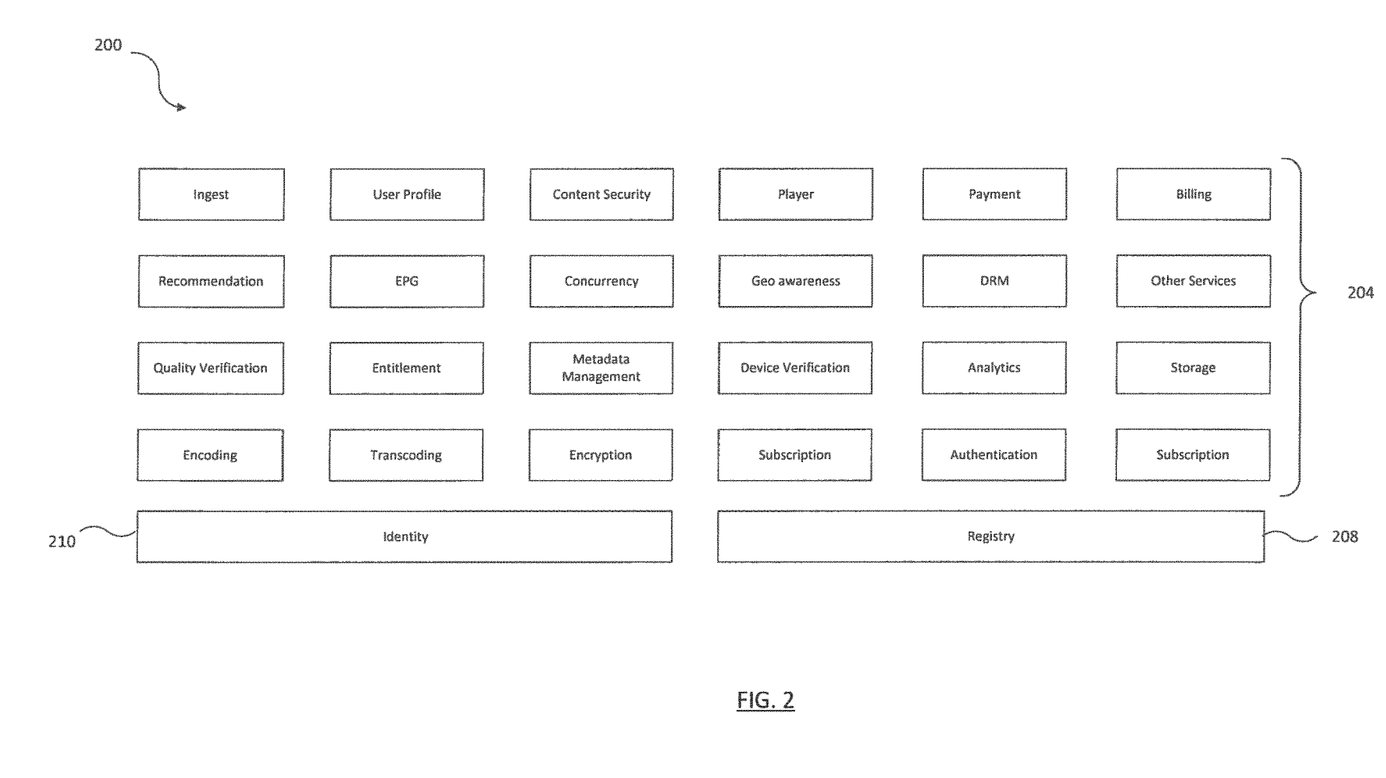
FIG. 2 a framework comprising a suite of services.

FIG. 2 illustrates a framework 200 comprising a suite of independent, modular services. A combination of a plurality of these services is provided by a video solution provider as part of a vertical video solution. A certain combination of these services may be wrapped together by the video solution provider and the vertical video solution may be sold as a product by the video solution provider to a video content provider. For example the vertical video solution may be an OTT solution or a video on demand (VOD) solution and depending on which, the services of the solution will differ. Alternatively, a certain combination of these services may be selected by a video content provider so instead of being a preconfigured video solution the vertical video solution is tailored to the specific needs of the video content provider to provide content to content consuming devices. A service of the framework 200 in a vertical video solution may be an on-premise service (in that it is implemented using computer resource on the premises of the video content provider) or a cloud based service. A cloud based service may be deployed on either a public cloud (the packet based network 106 is for example the Internet) or on a private cloud (the packet based network 106 is for example a private IP-based network) in order to deliver video content to content consumers associated with content consuming devices.

The framework 200 comprises a plurality of services 204 (services that may be interacted with to support the delivery of content to content consuming devices). The plurality of services 204 comprises services that can be interacted with by a content consumer using a content consuming device ("front-end" services) and services that supports delivery of content to a content consuming device without interaction with a content consumer ("back-end" services).

The services 204 communicate with each other via Application Programming Interfaces (APIs).

As shown in FIG. 2 the services 204 may include for example, recommendation of content, quality verification of content, storage of content, provision of an electronic programming guide (EPG), concurrency, verification of content consumer entitlement to view content, content metadata management, encoding, geographical awareness of the location of content consuming devices, content consumer device verification, transcoding, digital rights management (DRM), encryption of content, analytics, content consumer subscriptions to certain content, content delivery network (CDN), content ingestion, user profile management, content security, provision of a content player, payment, billing, and other services.

Upon registering an account with the video solution provider, the video solution provider provides the video content provider with access credentials assigned to the account of the video content provider by the video solution provider. The access credentials may for example be an API key (which is a long-lived unique key) and a preshared secret.

The identity service 210 stores information on the access credentials and permissions associated with the account of the video content provider.

The registry service 208 stores information on the services that are available for use in a vertical video solution. The video solution provider maintains the information stored in the registry service 208. For each service 204, the service may be provided by a plurality different service providers, and information on the service provided by each of the plurality different service providers is stored in the registry 208. Taking the service of providing an electronic programming guide (EPG) as an example, the registry service 208 stores information on the EPG services provided by different EPG providers that are available for use in a vertical video solution.

A service provider may register their service with the registry service 208 via an API call thereby publishing its interface and access information of the service to the registry service 208. Additionally, the video solution provider may manually enter information on a service using a web interface designed for administrative access. Thus the registry service 208 is a dynamically evolving catalogue of information about the available services that may be used in a vertical video solution provided by the video solution provider. In addition to details of the available services that may be used in a vertical video solution, the registry service 208 also stores service level agreement (SLA) information, as described in more detail below.

Figure 3:
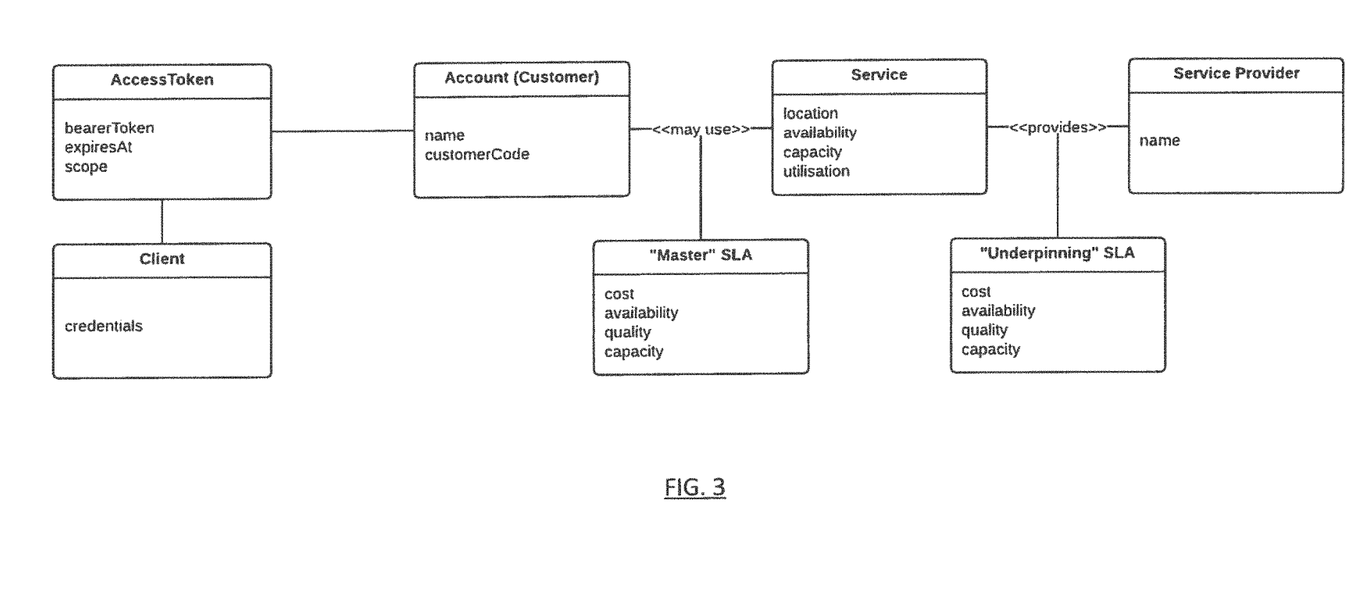
FIG. 3 is a domain model representation of registry service and identity service components of the content delivery system.

FIG. 3 illustrates an example domain model representation 300 of the registry service 208 and identity service 210.

As shown in FIG. 3, for each type of service 204 that is included in a video solution provided by a video solution provider to a particular customer (e.g. the video content provider), a "master" SLA (otherwise referred to herein as a default SLA) is associated with the service 204. The master SLA for a service 204 defines the basis of understanding between the video solution provider and the video content provider for delivery of the service. The master SLA defines a specified level of service (at least one service level requirement) that the video solution provider agrees to provide in delivering the particular service in the video solution to the particular video content provider and may define other clauses such as support options, incentive awards for service levels exceeded and/or penalty provisions for service levels not provided. A service level requirement may specify for example that an encoding service that is used to encode assets for the video content provider must have a specified level of availability, or that a transcoding service that is used to transcode assets for the video content provider does not charge more than 5 pence per transcode of a video asset. It will be appreciated that these are merely examples to illustrate the concept.

In order to deliver the master SLA for a particular service 204, the video solution provider is able to make use of one or more of the services provided by different service providers that provide the particular service 204. The video solution provider has an SLA with each service provider that provides the service 204. These SLAs are referred to herein as an "underpinning" SLA because it is the use of one or more of these services that delivers and underpins the overall service 204 provided in the vertical video solution.

The registry service 208 stores both master SLA information and underpinning SLA information.

The registry service 208 may also store "requested" service SLA information (not shown in FIG. 3).

The requested service SLA defines a specified level of service (different to that of the master SLA) that the video solution provider agrees to provide in delivering a particular service in the video solution to the particular video content provider, when requested to do so. To provide content to content consuming devices, the video solution provider acts on service requests transmitted from service requesters (e.g. the client shown in FIG. 3), which will be described in more detail below. An indicator (e.g. metadata) in the service request may specify that the task identified in the service request is to be provided in accordance with a particular "requested" service SLA (defining at least one service level requirement). For example, for a high priority task that requires a higher level of performance than that set out in the master SLA, metadata in the service request may identify that a particular requested service SLA is used instead of the master SLA. Similarly, for a low priority task that requires a lower level of performance than that set out in the master SLA, metadata in the service request may identify that a particular requested SLA is used instead of the master SLA. Thus a master SLA for a service can be overridden on a per request basis. In absence of metadata being present in a service request identifying that a requested service SLA is to be adhered to by the video solution provider in delivering the service identified in the service request, then the master SLA for the service that is identified in the service request is used.

The "client" shown in FIG. 3 refers to the client side of a client-server interaction; in particular the client corresponds to client software that transmits requests to the video solution provider in order to deliver video to content consuming devices of the content delivery system 100. The client shown in FIG. 3 may correspond to an application executed on a device (or executed within a web browser accessible on the device) which an administrator representing the video content provider can access in order to transmit a service request to the video solution provider. Alternatively, the client shown in FIG. 3 may be a service 204 acting on behalf of the video content provider to call another service 204. For example, a storage service may be configured to operate autonomously to periodically scan a storage location (e.g. a file server) to determine whether video assets have been stored at this storage location and be configured, in response to determining that video assets have been stored at this storage location, to call an encoding service by transmitting a service request to the encoding service to encode these stored assets on behalf of the video content provider. In either case, the service request comprises task information identifying a task to be performed that requires a service for the delivery of content and an identifier identifying the entity for whom the task is for (e.g. the video content provider). As will be appreciated by persons skilled in the art, various mechanisms exist that would enable the video solution provider to identify the identity of the entity for whom the task is for and determine whether the client is authorised to request the task identified in the task information.

One example mechanism which is illustrated in the domain model representation 300 is the issuance of an access token by the video solution provider to the client.

In order to obtain an access token, the client makes an API call to the identity service 210 with access credentials of the video content provider (for whom the task is for). The identity service 210 is configured to perform authentication of the client by determining whether the access credentials provided by the client is valid or not by performing an access credentials verification process. If the access credentials provided by the client are valid, the identity service 210 provides the client with an access token.

The identity service 210 stores permissions assigned to the video content provider by the video solution provider. The access token provided to the video content provider is short-lived (will expire). The access token may comprise an identifier of the video content provider (e.g. username), an expiry date/time, and permissions assigned to the video content provider by the video solution provider. Thus when an access token is presented together with a service request, the video solution provider is able to determine whether the client is authorised to request the task identified in the task information based on the permissions in the access token.

Whilst one example mechanism is described above that enables the video solution provider to authenticate and authorise the client, persons skilled in the art will appreciate that this is merely one example and other mechanisms (such as the use of multi-factor authentication or the exchange of certificates) may be used.

For each service 204, a plurality of processing nodes 110 may be available to provide the particular service.

In accordance with embodiments of the disclosure, decision logic configured by the video solution provider is used to select, for a particular service, at least one of the plurality of processing nodes 110 (that are able to provide the service) to provide the service. This is described in more detail with reference to FIGS. 4a and 4b.

Figure 4A:
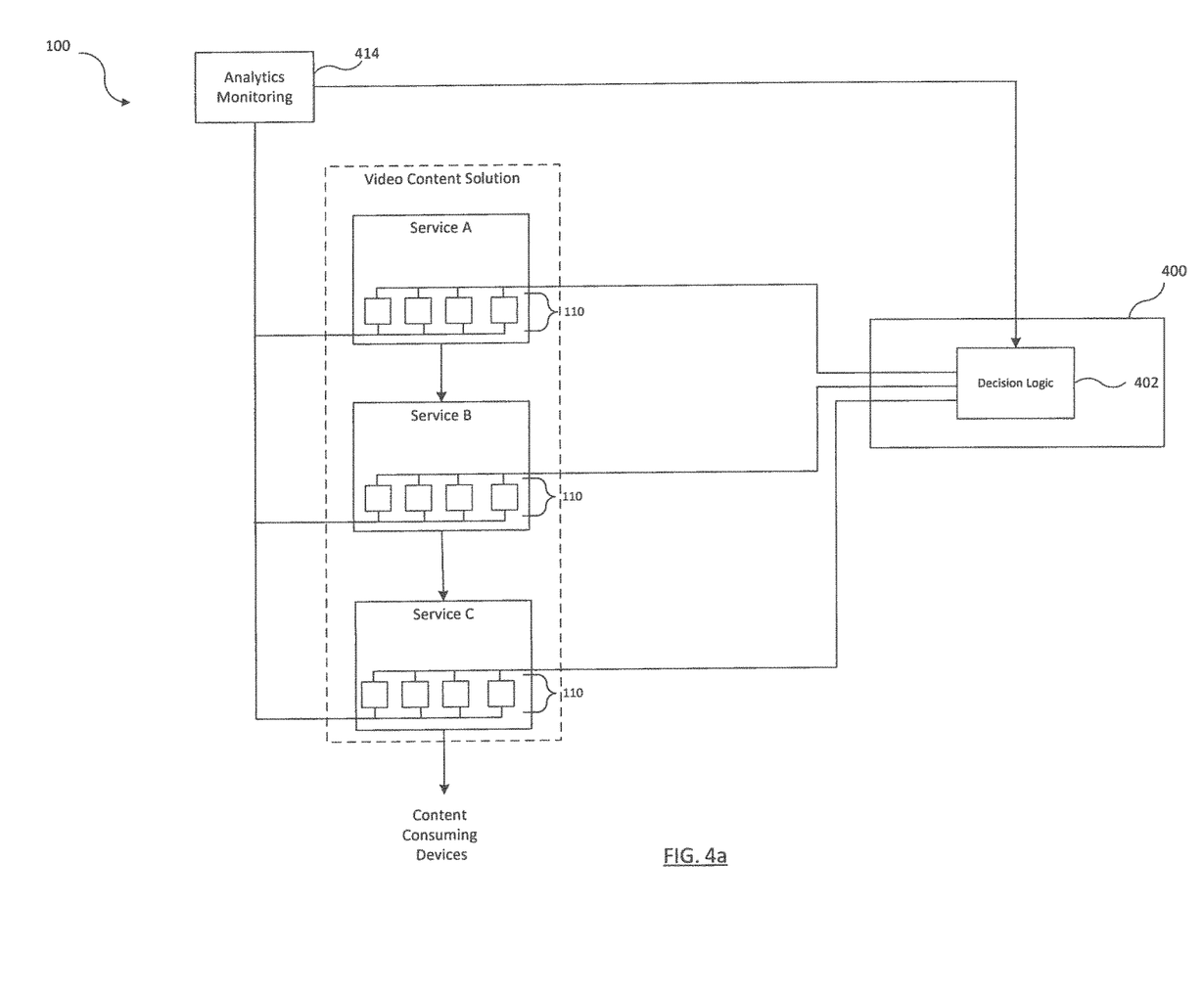
FIG. 4a is a schematic block diagram of the content delivery system.

FIG. 4a illustrates the content delivery system 100 shown in FIG. 1.

In the packet based network 106, a network entity 400 (e.g. a server) comprises decision logic 402. The functionality of the decision logic 402 may be implemented in code (software) stored on a memory (of the network entity 400) comprising one or more storage media, and arranged for execution on a processor (of the network entity 400) comprising one or more processing units. The code is configured so as when fetched from the memory and executed on the processor to perform operations in line with embodiments discussed below. Alternatively it is not excluded that some or all of the functionality of the decision logic 402 is implemented in dedicated hardware circuitry, or configurable hardware circuitry like a field-programmable gate array (FPGA).

A combination of services 204 are used to provide a tailored video solution. FIG. 4a illustrates a video solution based upon three services 204 for simplicity including "Service A", "Service B" and "Service C". It will be appreciated that this number of services 204 forming a video content solution is merely an example. To deliver each service of the video solution, a plurality of processing nodes 110 may be available to provide the particular service.

An analytics monitoring component 414 is configured to report characteristics of each processing node 110 to the decision logic 402 (this will be described in more detail later).

Figure 4B:
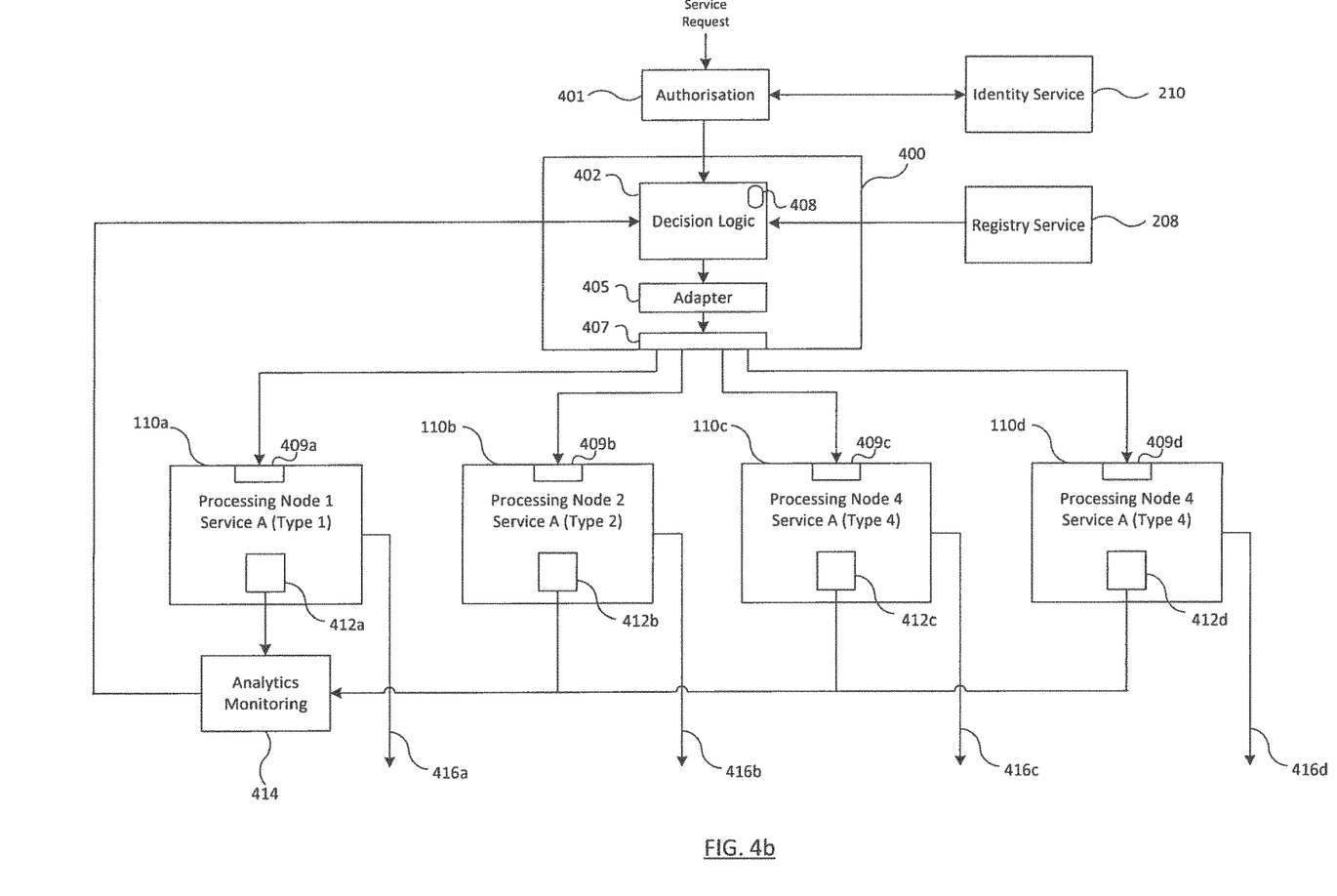
FIG. 4b is a more detailed schematic block diagram of the content delivery system.

Reference is now made to FIG. 4b to describe the operation of the decision logic 402 to optimise delivery of video content to content consuming devices in respect of a single service (Service A) of the videoing solution, however embodiments of the present disclosure also extend to optimising delivery of video content to content consuming devices in respect of a plurality of services of the video solution.

A client transmits a service request over the network 106 to an authorisation module 401. The authorisation module 401 may be implemented on the network entity 400 or on a separate network entity (as shown in FIG. 4*b*) in the network 106. The operation of the decision logic is described below with reference to an example whereby the service request comprises an identifier of the entity for whom the task is for (e.g. the video content provider) and task information identifying a task to be performed that requires a "Service A" for the delivery of content. Service A corresponds to a service shown in the framework 200 of FIG. 2.

The authorisation module 401 is configured to determine whether the client is authorised to request the task identified in the task information.

In the example described above whereby the identity service 210 provides the video content provider with an access token, the client is required to supply an access token along with the service request to the authorisation module 401. The authenticate and authorise module 401 is configured to determine whether the client is authorised to request the task identified in the task information by comparing permissions assigned to the video content provider (identified in the access token) with the task information. Whilst it has been described above that the access token comprises the permissions assigned to the video content provider, in other embodiments the access token does not comprise the permissions assigned to the video content provider. In these other embodiments, the authorisation module 401 is configured to query the identity service 210 to retrieve the permissions in order to make the comparison described above.

If the authorisation module 401 determines that the client is authorised to request the task identified in the task information, the authorisation module 401 is configured to supply the service request to the decision logic 402. If no access token is supplied with the service request, or if the authorisation module 401 determines that the client is not authorised to request the task identified in the task information based on comparing permissions assigned to the video content provider (identified in the access token) with the task information, the authorisation module 401 is configured to transmit a message to the client informing the client of the need to perform authentication (e.g. to obtain an access token) or that they are not authorised to request the task identified in the task information.

FIG. 4*b* illustrates how the network entity 400 is arranged to communicate with a plurality of processing nodes 110*a*-*d* in the packet based network 106 that implement the service "Service A". Whilst four processing nodes 110*a*-*d* that implement the service "Service A" are shown in FIG. 4*b*, this is merely an example.

Each of the plurality of processing nodes 110*a*-*d* implement the service "Service A" whereby the service "Service A" is provided by different service providers. That is, processing node 110*a* implements Service A provided by a first service provider, processing node 110*b* implements Service A provided by a second service provider, processing node 110*c* implements Service A provided by a third service provider, and processing node 110*d* implements Service A provided by a fourth service provider.

Whilst it has been described above that the processing nodes implement service A provided by service providers, it will be appreciated that one or more of the processing nodes 110*a*-*d* may implement Service A that is provided on a freely available basis. For example, in the context of Service A being an encoding service, persons skilled in the art will be familiar with encoding services provided by encoding service providers (e.g. Brightcove Inc., Harmonic Inc. Elemental Technologies Inc. etc.) as well as other encoding services such as the FFmpeg encoder which are not provided by a service provider per se.

The video solution provider may provide a plurality of services 204 themselves. Thus one of the service providers providing Service A may correspond to the video solution provider.

Additionally, each of the processing nodes 110 comprise a local agent 412. The functionality of a local agent 412 may be implemented in code (software) stored on a memory (of the processing node) comprising one or more storage media, and arranged for execution on a processor (of the processing node) comprising one or more processing units. The code is configured so as when fetched from the memory and executed on the processor to perform operations in line with embodiments discussed below. Alternatively it is not excluded that some or all of the functionality of the local agent 412 is implemented in dedicated hardware circuitry, or configurable hardware circuitry like a field-programmable gate array (FPGA).

The local agent 412 of each processing node 110 is configured to monitor and report characteristics of the processing node 110 on which it is executed on to the analytics monitoring component 414. The analytics monitoring component 414 is configured to report characteristics of each processing node 110 to the decision logic 402.

The characteristics may include for example:
the geographical position of the processing node;
the availability of the processing node—this is typically expressed as a percentage of uptime (time that the processing node is operational to implement service A) in a given time period. For example 99.9% (three nines) annual availability allows 8.73 hours of downtime a year, and 99.99% (four nines) annual availability allows 52.56 minutes of downtime a year.
the financial cost of using the processing node to implement service A, this may be for example a monthly fee or a cost per processing operation that is performed by the processing node (e.g. five pence per transcode of a video asset);
the quality of the output provided by the processing node, this is measured in dependence on the service that the processing node implements. For example, if service A is a transcoding service the quality of the output provided by the processing node would correspond to the quality of the video output from the transcoding service. Persons skilled in the art will appreciate that several different implementations of a standards based format (e.g. H264) are provided by different transcoding service providers each offering varying levels of output video quality. In another example, if service A is a geographical awareness service (to determine the location of content consuming devices) the quality of the output provided by the processing node would correspond to the accuracy of the location determination (for example whether the service provided a city, region, or country level indication of the location of a consuming device);
the capacity of the processing node (i.e. the number of concurrent requests that can be handled by the processing node in a given time period);
the throughput (i.e. response speed) of the processing node; and the utilization of the processing node. This may correspond to for example CPU utilization (the percentage of time the processing node spends processing data as opposed to being idle), memory utilization (the percentage of the total memory being used for processing performed by the processing node), and/or disk utilization (the percentage of the total disk space available for storage of data by the processing node).

It will be appreciated that some of these characteristics are static (e.g. the geographical position of the processing node) whereas other characteristics are dynamic (e.g. the capacity of the processing node)

The analytics monitoring component 414 may be implemented on the network entity 400 or on a separate network entity (as shown in FIGS. 4a and 4b) in the network 106. The analytics monitoring component 414 is configured to report characteristics of each processing node 110a-d to the decision logic 402.

The network entity 400 comprises an input for receiving the service request from the authorisation module 401. Based on receiving the service request from the authorisation module 401 via this input, the decision logic 402 is configured to retrieve, from the registry service 208, (i) desired SLA information (which may be a requested service SLA for delivery of Service A if specified in the service request, otherwise the master SLA for delivery of Service A agreed between the video solution provider and the video content provider) and (ii) each underpinning SLA agreed between the video solution provider and each service provider that provides Service A.

Based on the desired SLA information and the characteristics of the processing nodes 110a-d received from the analytics monitoring component 314, decision logic 402 is configured to determine which of the processing nodes 110a-d are able to meet the desired SLA.

Consider an example wherein "Service A" is an encoding service and each of the processing nodes 110a-d implement different types of encoding service. The task information received from a video content provider may for example indicate that media assets stored on a file server (not shown in the Figures) in the network 106 coupled to the network entity 400 are to be encoded. The file server in the network 106 may be identified by respective uniform resource locator (URL). The desired SLA for the encoding service 204 may specify for example that the media assets are encoded with an encoding service that provides 99.8% availability.

Based on the characteristics of the processing nodes 110a-d received from the analytics monitoring component 414, the decision logic 402 is able to determine which of the processing nodes 110a-d are able to provide the required 99.8% availability.

If the decision logic 402 determines that only a single processing node is able to provide the required 99.8% availability, then the decision logic 402 is configured to select this single processing node and communicate with the selected processing node to perform the encoding task.

If the decision logic 402 determines that a plurality of the processing nodes 110a-d are able to provide the required 99.8% availability, the decision logic 402 uses predetermined rules 408 configured by the video solution provider to determine which of the processing nodes that are able to provide the required 99.8% availability to select to perform the encoding task. The decision logic 402 may select one or more of the processing nodes 110a-d that are able to provide the required 99.8% availability to perform the encoding task, in dependence on the predetermined rules 408.

The predetermined rules 408 may specify that only one of the processing node that is able provide the required 99.8% availability should be selected to perform the encoding task. Alternatively, the predetermined rules 408 may specify that the encoding task should be balanced across a predetermined number of the processing nodes that are able to provide the required 99.8% availability.

If the decision logic 402 determines that no single processing node is able to provide the required 99.8% availability, then the decision logic 402 is configured to determine if a combination of the processing nodes 110a-d are able to collectively provide the required 99.8% availability through parallel execution. If the decision logic 402 determines that a single combination of the processing nodes 110a-d are able to collectively provide the required 99.8% availability through parallel execution then the decision logic 402 selects this single combination of processing nodes to perform the task. If the decision logic 402 determines that a plurality of combinations of processing nodes 110a-d are able to provide the required 99.8%, the decision logic 402 uses predetermined rules 408 configured by the video solution provider to determine which combination of the processing nodes that are able to collectively provide the required 99.8% availability should be selected to perform the encoding task.

The predetermined rules 408 referred to above may specify that one or more of the characteristics of the processing nodes 110a-d received from the analytics monitoring component 414 should be used in the selection of the one or more of the processing nodes 110a-d to perform the encoding task.

For example, the predetermined rules 408 may specify that the processing node(s) that is/are able provide the required 99.8% availability at the lowest financial cost compared to the other processing nodes or combinations of processing nodes that are able to provide the required 99.8% availability, should be selected to perform the encoding task. The decision logic 402 is able to determine the financial cost of using the processing nodes to implement Service A based on the characteristics of the processing nodes 110a-d received from the analytics monitoring component 414. In another example, the predetermined rules 408 may specify that only the processing node(s) located in a certain geographical location should be selected to perform the encoding task. The decision logic 402 is able to determine the geographical location of each of the processing nodes 110a-d based on the characteristics of the processing nodes 110a-d received from the analytics monitoring component 414.

The predetermined rules 408 referred to above may comprise a priority list of service providers providing Service A, and indicate that of the processing nodes that are able provide the required 99.8% availability, the processing node(s) associated with the service provider having the highest priority in the priority list should be selected to perform the encoding task.

If the decision logic 402 determines that no single processing node or combination of processing nodes are able to perform the encoding task whilst meeting the desired SLA (e.g. the required 99.8% availability), then the decision logic 402 is configured to determine if the desired SLA includes an indicator that the video content provider is willing to accept sub-optimal performance in the event that the level of service specified in the desired SLA cannot be provided. If the desired SLA includes such an indicator, the decision logic 402 is configured to select one or more processing node 110 that are able to achieve the highest availability to perform the encoding task and transmit a message to the video solution provider alerting them to the fact that the encoding task was performed without meeting the desired SLA. If the desired SLA does not include such an indicator, the decision logic 402 does not select one or more processing node to perform the encoding task. Instead, the decision logic 402 is configured to transmit a message to the video solution provider alerting them to the fact that the encoding task was not performed. This message can further indicate that the encoding task can only be performed without meeting the desired SLA. This message enables the client to resubmit the service request (identifying a particular requested SLA with lower service level requirement(s)) if they so wish.

Once the decision logic 402 has selected the processing node(s) 110 to perform the encoding task, the decision logic is configured to send the task information to the selected processing node(s) 110.

The network entity 400 comprises a communications interface 407 for communication with the plurality of processing nodes 110a-d. Each of the processing nodes 110 comprise a communications interface 409 for receiving data from the network entity 400. The network entity 400 can connect and communicate with a processing node 110 using an API. The API can be, for example, a REST (Representational State Transfer) API, or the API can be based on SOAP (Simple Object Access Protocol) or any other communication protocol known to persons skilled in the art.

It will be appreciated that each of the processing nodes may each be configured to receive task information using a different communication protocol. The network entity 400 comprises an adapter 405 that is configured to adapt the task information such that it can be received by the selected processing node(s) 110.

The outputs of the processing nodes 110a-d are shown in FIG. 4b by the reference numerals 416a-d. The processing nodes 110a-d output data to a destination identified in the task information. For example, if the processing nodes 110a-d provide a CDN service, the outputs of the processing nodes may be provided to content consuming devices. Whereas if the processing nodes 110a-d provide an encoding service, the outputs of the processing nodes (encoded video data) may be provided to a storage location in the network 106 identified in the task information. Characteristics of a processing node 110 are obtained in response to the processing node performing a task (instructed by the decision logic 402). The reliability of characteristics of a processing node 110 decreases over time if a processing node 110 is not used. In one embodiment, if a predetermined period of time has elapsed since the decision logic 402 last received characteristics of a particular processing node 110 from the analytics monitoring component 414 during which no further characteristics of the particular processing node 110 were received, then the decision logic 402 is configured to fall back on the underpinning SLA between the video solution provider and the service provider associated with the particular processing node 110 such that the decision logic 402 uses the underpinning SLA to determine if the processing node 110 is able to meet a desired SLA.

In another embodiment, if a predetermined period of time has elapsed since the decision logic 402 last received characteristics of a particular processing node 110 from the analytics monitoring component 414 during which no further characteristics of the particular processing node 110 were received, then the decision logic 402 is configured to supply a test task to the processing node 110. Following the processing node 110 performing the test task, characteristics of the processing node 110 are supplied from the analytics monitoring component 414 to the decision logic 402, this ensures the reliability of the characteristics of the processing nodes 110 by keeping them up to date.

If the decision logic 402 determines from characteristics of a particular processing node 110 providing a particular service received from the analytics monitoring component 414 that the processing node is longer meeting its underpinning SLA, then the decision logic 402 may blacklist this processing node 110 for a predetermined period, such that during this period the processing node is not considered by the decision logic 402 for selection in performing a task to be performed that requires the particular service. Thus, if a processing node 110 becomes unavailable due to for example a technical failure, this can be detected by the decision logic 402 and the decision logic 402 can select an alternative processing node or nodes and communicate with the newly selected processing node or nodes to perform the encoding task. That is, the provisioning of the processing nodes 110a-d to provide a particular service is dynamic.

Whilst the operation of the decision logic 402 has been described above with reference to the SLA for an encoding service specifying a required availability it will be appreciated that the principles of operation of the decision logic 402 also apply to other service level requirements (characteristics) specified in the SLA.

Furthermore whilst the operation of the decision logic 402 has been described above with reference to optimising an encoding service, principles of operation of the decision logic 402 also apply to other services 204 referred to above. In particular, the continual monitoring of characteristics of processing nodes is particularly advantageous in respect of a storage service 204. Based on the principles described above a plurality of processing nodes may provide a storage service to store media assets, and one of the processing nodes may be selected by the decision logic to provide this storage service in order to meet the desired SLA between the video solution provider and the video content provider. By continually monitoring the characteristics of this selected processing node, the video solution provider is able to detect if some assets are not accessed or only infrequently accessed (according to predetermined access criteria), often referred to as "cold" data in the art. This enables the video solution provider to move these assets to one or more alternative processing node that provides a storage service at a lower financial cost due to being designed for infrequent access to data, provided that the video solution provider is still able to meet the desired SLA.

Whilst the operation of the decision logic 402 has been described above with reference to the decision logic 402 optimising provision of a single service of a video solution, embodiments of the present disclosure extend to the decision logic 402 optimising provision of a plurality of services of a video solution. For example a video solution may comprise at least a storage service, an encoding service and a content player service, and embodiments of the present disclosure extend to the decision logic 402 optimising provision of at least one of these services of the video solution.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A network entity for delivering video content that is provided by a video content provider to a front end in accordance with service level information which defines at least one service level requirement for providing a service used in delivering the video content to the front end, the network entity comprising:
   an input for receiving a request comprising task information identifying a task to be performed requiring the service for delivery of the video content to the front end;
   an interface for communication with processing nodes each configured to provide the service for use in delivering the video content to the front end; and
   decision logic coupled to the interface and configured to:
      receive (i) the request transmitted by the video content provider, (ii) characteristics of the processing nodes, and (iii) the at least one service level requirement for providing the service;
      identify any processing node based on the received characteristics and the at least one service level requirement which meets the request;
         wherein if one processing node meets the request, that processing node is selected,
         wherein if more than one processing node meets the request, selecting one of the processing nodes in accordance with predetermined rules, wherein the predetermined rules specify one or more characteristics for use in the selection of processing nodes,
         wherein if no processing node meets the request:
            identifying any combinations of processing nodes which, based on the received characteristics and the at least one service level requirement, meets the request,
               wherein if a single combination of the processing nodes is identified as being able to perform the task in accordance with the at least one service level requirement, selecting the single combination of said processing nodes,
               wherein if a plurality of combinations of the processing nodes are able to perform the task in accordance with the at least one service level requirement, selecting one of the plurality of combinations of the processing nodes in accordance with predetermined rules,
            the decision logic being further configured to communicate via the interface with the selected processing node or combination of processing nodes to perform the task.

2. The network entity according to claim 1, wherein the decision logic is further configured to determine if the service request comprises an indicator indicating that the task is to be performed in accordance with requested service level information;
   wherein the at least one service level requirement corresponds to default service level information if the service request does not comprise the indicator; and
   the at least one service level requirement corresponds to requested service level information overriding the default service level information if the service request comprises the indicator.

3. The network entity according to claim 1, wherein the decision logic is configured to determine that only a single processing node of the processing nodes is able to perform the task in accordance with the at least one service level requirement, and in response to the determination select the single processing node and communicate via the interface with the selected single processing node to perform the task.

4. The network entity according to claim 1, wherein the predetermined rules specify that only one of the plurality of the processing nodes able to perform the task should be selected.

5. The network entity according to claim 1, wherein in response to determining no combination of the processing nodes is able to perform the task in accordance with the at least one service level requirement, the decision logic is configured to determine if the service level information comprises an indicator indicating that it is acceptable for the task to be performed without complying with the at least one service level requirement.

6. The network entity according to claim 5, wherein in response to determining the service level information comprises an indicator indicating that it is acceptable for the task to be performed without complying with the at least one service level requirement, the decision logic is configured to:
   select a processing node or combination of the processing nodes to perform the task;
   communicate via the interface with the selected processing node or combination of the processing nodes to perform the task; and
   transmit a message to the video content provider indicating that the task was performed without complying with the at least one service level requirement.

7. The network entity according to claim 5, wherein in response to determining the service level information does not comprise an indicator indicating that it is acceptable for the task to be performed without complying with the at least one service level requirement, the decision logic is configured to transmit a message to the video content provider indicating that the task was not performed.

8. The network entity according to claim 1, wherein the decision logic is configured to determine that a predetermined period of time has elapsed since characteristics of a processing node of the processing nodes have been received, and in response to the determination the decision logic is configured to consider the processing node for selection to perform the task using service level information that has been agreed with a service provider associated with the processing node for providing the service, instead of characteristics of the processing node.

9. The network entity according to claim 1, wherein the decision logic is configured to determine that a predetermined period of time has elapsed since characteristics of a processing node of the processing nodes have been received, and in response to the determination the decision logic is configured to supply a test task to the processing node that is to be performed by the processing node.

10. The network entity according to claim 1, wherein the decision logic is configured to determine based on received characteristics of a processing node that the processing node is not complying with service level agreement information that has been agreed with a service provider associated with the processing node for providing the service, and in response to the determination the decision logic is configured to remove the processing node from consideration for selection to perform the task for a predetermined period of time.

11. The network entity according to claim 1, wherein the characteristics include one or any combination of: a geographical positions of the processing nodes; an availability of the processing nodes; a financial cost of using the processing nodes; a quality of the output provided by the processing node; a capacity of the processing nodes; a throughput of the processing nodes; and a utilization of the processing nodes.

12. The network entity according to claim 1, wherein the service is one of: a content recommendation service, a content quality verification service, a content storage service, an electronic programming guide service, a concurrency service, a content consumer entitlement verification service, a content metadata management service, an encoding service, a geographical awareness of content consuming devices service, a device verification service, a transcoding service, a digital rights management service, a content encryption service, an analytics service, a content consumer subscriptions service, a content delivery network service, a content ingestion service, a user profile management service, a content security service, provision of a content player, a payment service, and a billing service.

13. The network entity according to claim 1, wherein the decision logic is configured to communicate via the interface with the selected at least one processing node using an application programming interface.

14. The network entity of claim 1 in which a plurality of services are used in combination for delivery of video content to a front end, wherein the plurality of services comprise at least a storage service, an encoding service and a content player service.

15. The network entity of claim 1, wherein it is determined that a plurality of processing nodes, in combination, are able to perform the task, and selecting one or both of an individual processing node and a combination of processing nodes in dependence on one or both of the service requirements and the one or more characteristics defined by the predetermined rules.

16. The network entity of claim 1, wherein if it is determined that a plurality of the processing nodes are individually able to perform the task in accordance with the at least one service level requirement; then the decision logic is configured to select at least one of the plurality of processing nodes in accordance with predetermined rules, wherein the predetermined rules specify one or more characteristics for use in the selection of the processing nodes; and communicate via the interface with the at least one processing node selected to perform the task.

17. A method for delivering video content that is provided by a video content provider to a front end in accordance with service level information which defines at least one service level requirement for providing a service used in delivering the video content to the front end, the method comprising:
receiving characteristics of processing nodes each configured to provide the service for use in delivering the video content to the front end;
receiving a request comprising task information identifying a task to be performed requiring the service for delivery of the video content to the front end;
receiving the at least one service level requirement for providing the service;
identifying any processing node based on the received characteristics and the at least one service level requirement which meets the request;
wherein if one processing node meets the request, that processing node is selected,
wherein if more than one processing node meets the request, selecting one of the processing nodes in accordance with predetermined rules, wherein the predetermined rules specify one or more characteristics for use in the selection of processing nodes,
wherein if no processing node meets the request:
identifying any combinations of processing nodes which, based on the received characteristics and the at least one service level requirement, meets the request,
wherein if a single combination of the processing nodes is able to perform the task in accordance with the at least one service level requirement, selecting the single combination of the processing nodes; and
wherein if a plurality of combinations of the processing nodes are able to perform the task in accordance with the at least one service level requirement, selecting one of the plurality of combinations of the processing nodes in accordance with predetermined rules, and
the method further comprising communicating via the interface with the selected processing node or combination of processing nodes to perform the task.

18. The method of claim 17, further comprising:
determining that a plurality of the processing nodes are individually able to perform the task in accordance with the at least one service level requirement;
selecting, in response to the determination, at least one of the plurality of processing nodes in accordance with predetermined rules, wherein the predetermined rules specify one or more characteristics for use in the selection of the processing nodes; and
communicating with the at least one processing node selected to perform the task.

19. A computer program product for delivering video content that is provided by a video content provider to a front end in accordance with service level information which defines at least one service level requirement for providing a service used in delivering the video content to the front end, the computer program product being embodied on a non-transient computer-readable medium and configured so as when executed on one or more processors to:
receive characteristics of processing nodes each configured to provide the service for use in delivering the video content to the front end;
receive a request comprising task information identifying a task to be performed requiring the service for delivery of the video content to the front end;
receive the at least one service level requirement for providing the service;
identify any processing node based on the received characteristics and the at least one service level requirement that meets the request;
wherein if one processing node meets the request, that processing node is selected,
wherein if more than one processing node meets the request, selecting one of the processing nodes in accordance with predetermined rules, wherein the predetermined rules specify one or more characteristics for use in the selection of processing nodes, wherein if no processing node meets the request:
   identifying any combinations of processing nodes which, based on the received characteristics and the at least one service level requirement, meets the request,
   wherein if a single combination of the processing nodes is able to perform the task in accordance with the at least one service level requirement, selecting the single combination of the processing nodes; and
   wherein if a plurality of combinations of the processing nodes are able to perform the task in accordance with the at least one service level requirement, selecting one of the plurality of combinations of the processing nodes in accordance with predetermined rules, and
communicating via the interface with the selected processing node or combination of processing nodes to perform the task.

\* \* \* \* \*